United States Patent
Kashiba et al.

(10) Patent No.: US 6,503,587 B2
(45) Date of Patent: *Jan. 7, 2003

(54) OXYGEN-ABSORBING MULTI-LAYER LAMINATE, PRODUCTION METHOD THEREOF AND PACKAGING CONTAINER

(75) Inventors: Takashi Kashiba, Kanagawa-ken (JP); Ryoji Otaki, Kanagawa-ken (JP); Yoshiki Ito, Kanagawa-ken (JP); Hideyuki Takahashi, Tokyo (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 09/266,040

(22) Filed: Mar. 11, 1999

(65) Prior Publication Data

US 2002/0001686 A1 Jan. 3, 2002

(30) Foreign Application Priority Data

| Mar. 12, 1998 | (JP) | 10/061313 |
| Jul. 27, 1998 | (JP) | 10/210848 |
| Aug. 13, 1998 | (JP) | 10/228974 |
| Jan. 8, 1999 | (JP) | 11-003102 |

(51) Int. Cl.[7] .......................... B29D 22/00; B32B 27/04; B32B 27/12; B32B 31/00
(52) U.S. Cl. .................. 428/35.7; 428/36.4; 428/36.6; 428/36.7; 428/297.4; 156/276
(58) Field of Search .............. 428/36.6, 36.7, 428/405, 297.4, 35.7, 36.4; 220/62.11; 252/188.28; 215/12.1, 12.2, 13.1; 427/201, 202, 203, 205; 156/276, 309.3

(56) References Cited

U.S. PATENT DOCUMENTS

| 2,991,208 | A | * | 7/1961 | Stieger | 154/46 |
| 3,451,884 | A | * | 6/1969 | Anno et al. | 161/53 |
| 4,535,901 | A | * | 8/1985 | Okudaira et al. | 215/1 C |
| 4,919,984 | A | * | 4/1990 | Maruhashi et al. | 428/36.4 |
| 5,143,763 | A | * | 9/1992 | Yamada et al. | 428/36.2 |
| 5,153,038 | A | * | 10/1992 | Koyama et al. | 428/35.8 |
| 5,492,742 | A | * | 2/1996 | Zenner et al. | 428/35.2 |
| 5,498,364 | A | * | 3/1996 | Speer et al. | 252/188.28 |
| 5,686,161 | A | | 11/1997 | Cullen et al. | |
| 5,744,056 | A | * | 4/1998 | Venkateshwaran et al. | 252/188.28 |
| 5,820,956 | A | * | 10/1998 | Hatakeyama et al. | 428/36.6 |

FOREIGN PATENT DOCUMENTS

| EP | 0 428 736 A | 5/1991 | |
| EP | 0 787 764 A | 8/1997 | |
| JP | 55-116434 | 9/1980 | |
| JP | 2-72851 | 3/1990 | |
| JP | 4-90848 | 3/1992 | |
| JP | 6-506140 | 7/1994 | |
| JP | 8-72941 | 3/1996 | |
| JP | 8-132573 | 5/1996 | |
| JP | 9-40024 | 2/1997 | |
| JP | 411048385 A | * 2/1999 | B32B/7/02 |
| WO | WO 92/12004 | 7/1992 | |

\* cited by examiner

Primary Examiner—Rena L. Dye
Assistant Examiner—Michael C. Miggins
(74) Attorney, Agent, or Firm—Frishauf, Holtz, Goodman, Langer & Chick, P.C.

(57) ABSTRACT

An oxygen-absorbing multi-layer laminate suitable for preserving food, etc. due to its excellent ability of retaining flavor and taste of food, a method of efficiently producing the oxygen-absorbing multi-layer laminate and a packaging container made of the oxygen-absorbing multi-layer laminate. The oxygen-absorbing agent is interspersed between a first thermoplastic resin layer and a second thermoplastic resin layer, or sandwiched between the integrally bonded first and second thermoplastic resin layers. In the oxygen-absorbing multi-layer laminate having at least three thermoplastic resin layers, the oxygen-absorbing agent is interspersed or interposed between the adjacent layers of at least one adjacent pair. With such a construction, the oxygen-absorbing ability is improved to prolong the storage life of retaining flavor and taste of food.

26 Claims, 1 Drawing Sheet

OXYGEN-ABSORBING MULTI-LAYER LAMINATE, PRODUCTION METHOD THEREOF AND PACKAGING CONTAINER

BACKGROUND OF THE INVENTION

1. Field of the Invention

The present invention relates to an oxygen-absorbing multi-layer laminate, a production method thereof and a packaging container. More specifically, the present invention relates to an oxygen-absorbing multi-layer laminate suitable for food preservation, etc. due to its excellent ability of preserving flavor and taste of food, a method of efficiently producing the oxygen-absorbing multi-layer laminate and a packaging container made of the oxygen-absorbing multi-layer laminate.

2. Description of the Prior Art

A recent development in the technique of oxygen-absorbing packaging has provided a packaging container made of a multi-layer laminate having an oxygen-absorbing layer made of an oxygen-absorbing resin composition comprising a thermoplastic resin and an oxygen-absorbing agent. With such a construction, the packaging container has been improved in gas barrier properties and imparted with an oxygen-absorbing function. An oxygen-absorbing multi-layer laminate comprising an intermediate oxygen-absorbing layer between a gas barrier outer layer and an oxygen-permeating inner layer is usually fabricated into an oxygen-absorbing packaging container with multi-layer structure, for example, a bag, cup, tray, bottle, etc., due to their easiness of forming.

Japanese Patent Application Laid-Open Nos. 2-72851 and 4-90848 disclose oxygen-absorbing multi-layer laminates and films having an oxygen-absorbing layer made of a resin dispersed with an iron-based oxygen-absorbing agent. Japanese Patent Application Laid-Open No. 8-72941 proposes a technique for improving the oxygen-absorbing ability of an oxygen-absorbing multi-layer laminate. Furthermore, Japanese Patent Application Laid-Open Nos. 8-132573 and 9-40024 disclose oxygen-absorbing multi-layer laminates in which a polyolefin layer is interposed between a resin layer containing an oxygen-absorbing agent and a gas barrier layer.

Generally, in the production of the oxygen-absorbing multi-layer film or sheet, a compound prepared by kneading an iron-based oxygen-absorbing agent into a thermoplastic resin such as polyolefin is melted and laminated on another resin layer to form an oxygen-absorbing layer. In this method, since the preparation of the compound and the lamination process thereof inevitably include a step of melting at a high temperature for a certain period of time, an offensive odor is generated due to degradation of the molten resin by the action of the oxygen-absorbing agent present therein, and the resulting film or sheet has a poor appearance due to the vaporization of the moisture in the oxygen-absorbing composition. In addition, to facilitate the lamination process, the oxygen-absorbing layer is required to have a suitable level of thickness, this likely affecting the bending properties of the resulting oxygen-absorbing multi-layer film.

The oxygen-absorbing ability of an oxygen-absorbing multi-layer laminate or a packaging container made thereof is evaluated by an oxygen-absorbing rate per unit area of the oxygen-absorbing multi-layer laminate as well as by an oxygen-absorbing capacity defined as a maximum amount of oxygen being absorbed per unit area of the oxygen-absorbing multi-layer laminate.

The oxygen-absorbing rate depends mainly on a content of the oxygen-absorbing agent in the oxygen-absorbing multi-layer laminate and a permeating speed of oxygen from the surface of a packaging container until reaching the oxygen-absorbing agent in the oxygen-absorbing layer. The oxygen-absorbing capacity depends largely on the content of the oxygen-absorbing agent in the oxygen-absorbing multi-layer laminate.

To obtain an oxygen-absorbing multi-layer laminate having a high oxygen-absorbing ability, i.e., a large oxygen-absorbing rate and a large oxygen-absorbing capacity, the oxygen-absorbing resin layer in the multi-layer laminate is needed to be made of a resin compound containing the oxygen-absorbing agent in a high content. However, the flowability of the compound drastically decreases with increasing content of the oxygen-absorbing agent to make it difficult to prepare the compound and extrude it into a film with uniform thickness from a T-die extruder. For this reason, there is a practical limit in increasing the content of the oxygen-absorbing agent in the compound.

Alternatively, the oxygen-absorbing capacity may be improved by increasing the thickness of the oxygen-absorbing resin layer while controlling the oxygen-absorbing agent therein to a low content. However, the oxygen-absorbing rate is not improved sufficiently by merely increasing the thickness of the oxygen-absorbing resin layer, thereby failing to obtain a substantial improvement in the oxygen-absorbing ability. In addition, an increased thickness of the oxygen-absorbing resin layer, in turn, unnecessarily increases the total thickness of the oxygen-absorbing multi-layer laminate to result in several problems such as deterioration of the properties required for the packaging material, a poor secondary processability in thermoforming, bag making, etc. and an increased material cost.

Japanese Patent Application Laid-Open No. 55-116434 and Japanese Patent Application Late Laid-Open No. 6-506140 disclose a label oxygen absorber produced by fixing an iron-based oxygen-absorbing agent on an adhesive layer applied on a base film and then disposing a cover sheet such as a gas-permeable resin film, etc. so as to adhere the cover sheet to the base film through a portion of the adhesive with no oxygen-absorbing agent. However, there is a fear of leakage of the oxygen-absorbing powder separated from the adhesive layer due to insufficient fixing as well as a fear of inhibition of the oxygen-absorbing reaction by water penetrated into the space between the iron powder and the cover sheet. Therefore, the proposed label oxygen absorber is not suitable for preserving foods of high water content.

In addition, the oxygen-absorbing multi-layer laminate generally suffers from a problem of deterioration in appearance, film strength and heat sealability when the oxygen-absorbing agent in the oxygen-absorbing resin layer is exposed on the surface contacting foods.

SUMMARY OF THE INVENTION

Accordingly, a first object of the present invention is to provide a oxygen-absorbing multi-layer laminate capable of saving cost in practical use and excellent in the oxygen-absorbing ability, mechanical strength, heat sealing properties, etc. by avoiding the drawbacks encountered in the conventional oxygen-absorbing multi-layer laminate produced by fabricating a compound incorporated with the oxygen-absorbing agent, namely, drawbacks such as separation and leakage of the oxygen-absorbing particle due to insufficient fixing and generation of odor due to deterioration of resin through heat-melting.

A second object of the present invention is to provide a method for efficiently producing the oxygen-absorbing multi-layer laminate having a high cost-performance and excellent properties.

A third object of the present invention is to provide a packaging container made of the oxygen-absorbing multi-layer laminate having a high cost-performance and excellent properties, which is suitable for use in preserving foods due to its excellent oxygen-absorbing ability and long storage life for retaining the flavor and taste of foods.

As a result of an intense search in view of the above objects, the inventors have found that a laminate having two layers or more, in which particles of the oxygen-absorbing agent are locally distributed between adjacent layers or the adjacent layers are bonded to each other through interposed particles of the oxygen-absorbing agent to form an integral part, is suitable as the oxygen-absorbing multi-layer laminate meeting the above object. Also, the inventors have found that an oxygen-absorbing multi-layer laminate having a gas barrier layer disposed on one of the surfaces thereof, or having an oxygen-permeating layer on one of the surfaces thereof and a gas barrier layer on the other surface thereof is particularly suitable for the first object.

In addition, the inventors have found that the second object can be achieved by uniformly sprinkling particles of the oxygen-absorbing agent on the surface of a first thermoplastic resin layer and then thermally press-bonding a second thermoplastic resin layer onto the sprinkled surface.

The inventors have further found that a packaging container, at least a part of the surface thereof being made of the above oxygen-absorbing multi-layer laminate having at least a gas barrier layer laminated on one of the surfaces thereof, can meet the third object.

The present invention has been accomplished based on the above findings.

Thus, the present invention provides:

(1) An oxygen-absorbing multi-layer laminate comprising a first thermoplastic resin layer, a second thermoplastic resin layer and an oxygen-absorbing agent in which particles of the oxygen-absorbing agent are locally interspersed between the first and second thermoplastic resin layers (first oxygen-absorbing multi-layer laminate);

(2) An oxygen-absorbing multi-layer laminate comprising a first thermoplastic resin layer, a second thermoplastic resin layer and an oxygen-absorbing agent in which the first and second thermoplastic resin layers are integrally bonded to each other while interposing particles of the oxygen-absorbing agent (second oxygen-absorbing multi-layer laminate);

(3) An oxygen-absorbing multi-layer laminate having at least three thermoplastic resin layers in which particles of the oxygen-absorbing agent are locally interspersed between adjacent layers of at least one adjacent pair (third oxygen-absorbing multi-layer laminate);

(4) An oxygen-absorbing multi-layer laminate having at least three thermoplastic resin layers in which each pair of adjacent layers are integrally bonded to each other and particles of the oxygen-absorbing agent are interposed between integrally bonded adjacent layers of at least one adjacent pair (fourth oxygen-absorbing multi-layer laminate);

(5) Oxygen-absorbing multi-layer laminates (1) to (4), each further having a gas barrier layer on at least one of the surfaces;

(6) Oxygen-absorbing multi-layer laminates (1) to (4), each further having an oxygen-permeating layer on at least one of the surfaces and a gas barrier layer on the opposite surface;

(7) A method of producing an oxygen-absorbing multi-layer laminate, comprising a step of uniformly sprinkling particles of an oxygen-absorbing agent on the surface of a first thermoplastic resin film, and a step of thermally press-bonding a second thermoplastic resin film onto the sprinkled surface of the first thermoplastic resin film; and (8) A packaging container in which at least a part of the surface thereof is made of the oxygen-absorbing multi-layer laminate (5) or (6).

PREFERRED EMBODIMENTS OF THE INVENTION

The oxygen-absorbing agent in the form of particles usable in the oxygen-absorbing multi-layer laminate of the present invention is not strictly limited so long as it has a good oxygen-absorbing ability and it can be fixedly interposed between adjacent thermoplastic resin layers. Preferably, the oxygen-absorbing agent is a mixture comprising an oxidizable main component and an auxiliary component. The oxidizable main component may be a metal powder, a salt of sulfurous acid, a salt of dithionous acid, an ascorbic acid, a salt of ascorbic acid or an ester of ascorbic acid. Of the above, the metal powder is preferable, and an iron powder is particularly preferable. The auxiliary component is a substance for promoting the oxygen-absorbing reaction of the main component, and exemplified by a metal halide.

The iron powder, preferably used as the main component, is not strictly limited in its purity so long as it has a good oxygen-absorbing ability, and for example, the iron powder may be partially oxidized in its surface and may contain another metal. The iron powder is preferably in the shape of particles and may be a reduced iron powder, an atomized iron powder, an electrolytic iron powder, and pulverized and ground products of an iron product such as a cast iron, a steel, etc. The averaged particle size of the iron powder is preferably 1–150 $\mu$m and more preferably 5–100 $\mu$m in view of obtaining a good effect and reducing the production cost.

The metal halide as a preferred auxiliary component catalytically promotes the oxygen-absorbing reaction of the main component such as the iron powder, etc. The metal halide may include a chloride, a bromide and an iodide of an alkali metal and an alkaline earth metal, and a halide or an iodide of lithium, sodium, potassium, magnesium, calcium, or barium are preferably used. The addition amount of the metal halide is preferably 0.1–20 parts by weight, more preferably 0.1–5 parts by weight based on 100 parts by weight of the iron powder.

The metal halide is preferably mixed with the iron powder so as to fixedly deposit on the surface of the iron powder to prevent easy removal of the metal halide from the iron powder during the production of the oxygen-absorbing multi-layer laminate and subsequent use thereof. The mixing method may include a method of mixing the metal halide with the iron powder in a ball mill, a speed mill, etc., a method of filling minute recesses on the surface of the iron powder with the metal halide, a method of bonding the metal halide to the surface of the iron powder by a binder, and a method of mixing an aqueous metal halide solution with the iron powder and subsequently drying the mixture to deposit the metal halide to the surface of the iron powder.

The oxygen-absorbing agent is preferably an iron-based composition in the form of particles comprising an iron powder and the metal halide. More preferred oxygen-absorbing agent is a composition comprising a metal halide-coated iron powder.

The oxygen-absorbing agent usable in the present invention may contain, if desired, an alkaline earth metal oxide, a silane dispersant, a titanate dispersant, a filler such as clay, mica, silica, calcium carbonate, etc., an adsorbent such as an activated carbon, zeolite, etc.

The thermoplastic resin layer of the oxygen-absorbing multi-layer laminate of the present invention is preferably made of a polyolefin excellent in the fusion bonding property and the oxygen permeability. The polyolefin may be exemplified by a polyethylene such as a low-density polyethylene, a medium-density polyethylene, a straight-chain low-density polyethylene, a high-density polyethylene, etc.; a polypropylene such as a propylene homopolymer, a propylene-ethylene block copolymer, a propylene-ethylene random copolymer, etc.; a metallocene polyolefin such as a metallocene polyethylene, a metallocene polypropylene, etc.; an elastomer such as a polymethylpentene, an ethylene-vinyl acetate copolymer, and an ethylene-α-olefin copolymer, etc. The polyolefins recited above may be used alone or in combination. Of the above polyolefins, the propylene-ethylene random copolymer, the propylene-ethylene block copolymer, the straight-chain low-density polyethylene and the metallocene polyethylene are more preferable.

In a first preferred embodiment of the oxygen-absorbing multi-layer laminate of the present invention, the particles of the oxygen-absorbing agent is locally interspersed between the adjacent first thermoplastic layer and second thermoplastic layer. In the present invention, the words "locally interspersed" mean that the particles of the oxygen-absorbing agent are distributed in the vicinity of the interface between the adjacent layers while some particles are present in one of the adjacent layers and the other particles are present in both the layers. With such a local distribution of the oxygen-absorbing particles between the adjacent layers, the oxygen-absorbing ability of the oxygen-absorbing multi-layer laminate can be enhanced. For example, in a packaging container made of a multi-layer laminate comprising a first thermoplastic resin layer, a second thermoplastic resin layer and a gas barrier layer in series from the inside to the outside, the oxygen in the container can be efficiently absorbed by the oxygen-absorbing agent when the oxygen-absorbing agent in the second thermoplastic resin layer is locally interspersed in the vicinity of the interface between the first and second thermoplastic resin layers because the oxygen-absorbing particles are located nearer to the inner surface of the container.

In a second preferred embodiment of the oxygen-absorbing multi-layer laminate of the present invention, a first thermoplastic resin layer and a second thermoplastic resin layer are integrally bonded to each other while interposing the particles of the oxygen-absorbing agent therebetween. The words "integrally bonded" used herein mean that the first and second thermoplastic resin layers are thermally press-bonded to each other while interposing particles of the oxygen-absorbing agent therebetween, thereby tightly laminating the thermoplastic resin layers so as not to permit any gap therebetween to form an integral part of the thermoplastic resin layers and the oxygen-absorbing agent. To ensure the lamination of the thermoplastic resin layers without permitting a gap therebetween while sandwiching particles of the oxygen-absorbing agent, the particles of the oxygen-absorbing agent are preferred to be embedded in the thermoplastic resin layers. Specifically, the particles of the oxygen-absorbing agent are preferably embedded in either of the thermoplastic resin layers or both the thermoplastic resin layers. To enhance the bonding strength between the thermoplastic resin layers, the materials for the first and second thermoplastic resin layers are preferably selected from a combination of resins capable of fusion-bonding to each other.

In the first and second embodiments, the amount of the oxygen-absorbing agent being used is preferably 1–150 g and more preferably 3–100 g per 1 $m^2$ of the oxygen-absorbing multi-layer laminate. An amount less than the above range results in an insufficient oxygen-absorbing ability. When exceeding the above range, the bonding of the first and second thermoplastic resin layers is insufficient to adversely affect the mechanical strength and fabrication efficiency of the oxygen-absorbing multi-layer laminate.

In addition, in the first and second embodiments, it is preferred that at least one of the first and second thermoplastic resin layers is oxygen-permeable. In applying the oxygen-absorbing multi-layer laminate of the present invention to the preservation of food, etc., the oxygen-permeable thermoplastic resin layer serves as a separating layer for keeping food, etc. being preserved separated from the oxygen-absorbing agent. Simultaneously, the oxygen-permeable thermoplastic resin layer allows oxygen in the atmosphere surrounding the food, etc. to easily pass the layer to reach the oxygen-absorbing agent. As a preferred material for the oxygen-permeable thermoplastic resin layer, the polyolefins described above may be mentioned.

To conceal the particles of the oxygen-absorbing agent from the sight, it is preferred that at least one of the first and second thermoplastic resin layers is colored by a pigment. The pigment may include an iron oxide such as red iron oxide, carbon black, calcium carbonate, a cadmium pigment, titanium oxide, etc., and titanium oxide is preferably used. The blending amount of the pigment usually depends on the thickness of the thermoplastic resin layer, and preferably is 0.5–40% by weight based on the thermoplastic resin layer. When the amount is too low, the oxygen-absorbing agent is insufficiently concealed, while an excess amount of the pigment deteriorates the bonding properties of the thermoplastic resin layer. The thermoplastic resin layer incorporated with the pigment makes the oxygen-absorbing agent hardly visible from the outside, and efficiently conceals iron powders and rust thereof from the external sight, thereby providing the oxygen-absorbing multi-layer laminate with a good appearance.

In addition to the pigment, the first and second thermoplastic resin layers may contain another additive such as a slip agent, an antioxidant, an oxide of alkaline earth metal, activated carbon, zeolite, etc.

The oxygen-absorbing multi-layer laminates of the first and second preferred embodiments may be produced by various methods. For example, the oxygen-absorbing agent is uniformly sprinkled on the adhesive surface of a first thermoplastic resin film coated with an adhesive, and then, a second thermoplastic resin film is laminated thereon by press-bonding so as to sandwich the sprinkled oxygen-absorbing agent. In view of obtaining good properties and reducing the production cost, it is preferred to produce the oxygen-absorbing multi-layer laminate by the method of the present invention including a thermal press-bonding process, as described below. According to the method of the present invention, the oxygen-absorbing multi-layer laminate is produced with a greater efficiency by sprinkling the particles of the oxygen-absorbing agent uniformly on the surface of a first thermoplastic resin film, followed by thermally press-bonding a second thermoplastic resin film onto the sprinkled surface. The sprinkling method is not strictly limited so long as the oxygen-absorbing agent is evenly sprinkled, and any known apparatus for sprinkling a powdery material on a film may be used. Also, a known apparatus for use in film lamination may be used in the thermal press-bonding process. Since the method of the present invention is capable of mass production with simplified apparatuses, the production cost can be favorably reduced.

The production method of the present invention will be described more specifically. After uniformly sprinkling the particles of the oxygen-absorbing agent on the surface of the first thermoplastic resin film, the second thermoplastic resin film being extruded from a T-die in a molten state is laminated on the first thermoplastic resin film while interposing the sprinkled oxygen-absorbing agent. Then, the laminated body is subjected to a thermal press-bonding by a roll and a subsequent cooling to obtain the oxygen-absorbing multi-layer laminate in which the first and second thermoplastic resin layers are bonded to each other to form an integral part while interposing the oxygen-absorbing agent. Alternatively, the oxygen-absorbing agent may be sprinkled on the pre-heated surface of the first thermoplastic resin film, and then, the second thermoplastic resin film is press-bonded to the first thermoplastic resin film by rolling, thereby forming an integral laminate. By employing the thermal press-bonding, the first and second thermoplastic resin layers are closely bonded to each other to permit no gap between the layers and no interstice around the particles of the oxygen-absorbing agent. The thermal press-bonding has additional advantages of preventing the separation of the oxygen-absorbing agent from the layers because particles thereof are embedded in the surface of the layers, and providing an interlaminar bonding sufficiently strong to prevent a delamination thereby to ensure the production of a high-performance oxygen-absorbing multi-layer laminate with an integrally laminated structure.

The oxygen-absorbing multi-layer laminates of the third and fourth preferred embodiments of the present invention have a laminated structure of three thermoplastic resin layers or more. In the third oxygen-absorbing multi-layer laminate, the oxygen-absorbing agent is locally interspersed in the vicinity of at least one interface between adjacent layers. In the fourth oxygen-absorbing multi-layer laminate, the particles of the oxygen-absorbing agent are interspersed in the vicinity of at least one interface between adjacent layers which are integrally bonded to each other. The locally interspersed particles of the oxygen-absorbing agent between the adjacent layers and the integral bonding of the adjacent layers while interposing the oxygen-absorbing agent therebetween are described above with respect to the first and second oxygen-absorbing multi-layer laminates.

When a large amount of the oxygen-absorbing agent is locally interspersed or interposed between the adjacent layers, the bonding strength of the layers likely decreases to cause the delamination of the layers. When the amount of the oxygen-absorbing agent is reduced to avoid this problem, the oxygen-absorbing ability is lowered. Thus, in the third and fourth embodiments, a limited amount of the oxygen-absorbing agent is locally interspersed or interposed in the vicinity of at least two interfaces of adjacent layers in a laminated structure having at least three thermoplastic resin layers, thereby retaining the interlaminar strength of a desired level without decreasing the oxygen-absorbing ability.

In the third and fourth oxygen-absorbing multi-layer laminate, the amount of the oxygen-absorbing agent being locally interspersed or interposed between each pair of adjacent layers is preferably 1–150 g, and more preferably 3–100 g per 1 $m^2$ of the oxygen-absorbing multi-layer laminate. The total amount of the oxygen-absorbing agent in the oxygen-absorbing multi-layer laminate depends on the application, and is in the range obtained by multiplying the above range by the number of the interfaces, in the vicinity thereof the oxygen-absorbing agent being interspersed or interposed. Usually, the total amount is preferably 5–300 g, more preferably 10–150 g per 1 $m^2$ of the oxygen-absorbing multi-layer laminate. An amount of the oxygen-absorbing agent less than the above range results in an insufficient oxygen-absorbing ability, while an amount higher than the above range makes the bonding between the layers insufficient or adversely affects the mechanical strength and fabrication quality of the oxygen-absorbing multi-layer laminate.

Like the first and second oxygen-absorbing multi-layer laminates, at least one of the outermost thermoplastic resin layers of the third and fourth oxygen-absorbing multi-layer laminates is preferred to be oxygen-permeable, and at least one thermoplastic resin layers thereof is preferred to be colored by the pigment.

The thickness of each layer of the first to fourth oxygen-absorbing multi-layer laminates is preferably 10–80 $\mu$m and more preferably 20–60 $\mu$m in view of obtaining good bending properties and preventing the oxygen-absorbing agent from bleeding to the laminate surface.

In the first to fourth oxygen-absorbing multi-layer laminates, at least one thermoplastic resin layer may be made of a resin composition incorporated with an oxygen-absorbing agent, namely a resin layer having uniformly dispersed therein with an oxygen-absorbing agent, to increase the oxygen-absorbing capacity. The amount of the oxygen-absorbing agent in such an oxygen-absorbing resin layer is preferably 10–60% by weight and more preferably 20–60% by weight. When the amount is in said range, significant advantage of using such an oxygen-absorbing resin layer is obtained. An amount exceeding 60% by weight makes the formation of the oxygen-absorbing resin layer difficult to deteriorate the production efficiency.

The first to fourth oxygen-absorbing multi-layer laminates of the present invention are used for preserving foods, etc. as an oxygen absorber with or without packaged in a packaging material. When used as a material for an oxygen-absorbing packaging container, the oxygen-absorbing multi-layer laminate is preferred to have a gas barrier layer laminated on one surface thereof.

The gas barrier layer prevents permeation of oxygen from the outside into the inside of the packaging container, and may be made from a foil of metal such as aluminum, etc., a film of gas barrier resin such as polyvinylidene chloride, a saponified ethylene-vinyl acetate copolymer, nylon 6, nylon 6,6, nylon MXD6, polyethylene terephthalate, etc., a deposited film such as an aluminum deposited film, silica deposited film, etc. These materials may be used alone or in combination.

In the first to fourth oxygen-absorbing multi-layer laminates, the gas barrier layer is formed, for example, by laminating a gas barrier film on the first or second thermoplastic resin film prior to thermally press-bonding the first and second thermoplastic resin films; by laminating a gas barrier film on the first or second thermoplastic resin film simultaneously with thermally press-bonding the first and second thermoplastic resin films; or by laminating a gas barrier film on one surface of a final oxygen-absorbing multi-layer laminate. The lamination may be conducted by a known laminating technique such as an extrusion lamination, a dry lamination, a hot melt lamination, etc. The thickness of the gas barrier layer is preferably 1–80 $\mu$m and more preferably 5–60 $\mu$m.

A protecting layer made of a thermoplastic resin may be disposed on the gas barrier layer to prevent the fracture thereof and occurrence of pin holes. The resin for the protecting layer may include a polyethylene such as a high density polyethylene, etc.; a polypropylene such as a propylene homopolymer, a propylene-ethylene random copolymer, a propylene-ethylene block copolymer, etc.; a polyamide such as nylon 6, nylon 6,6, etc.; a polyester such as polyethylene terephthalate, etc.; and a combination of these resins.

The overall thickness of the first to fourth oxygen-absorbing multi-layer laminates of the present invention is not specifically limited and may be selected according to the number of layers and the application. Preferably, the overall thickness is 30–250 $\mu$m, and more preferably 50–150 $\mu$m.

In a preferred embodiment of the present invention, of the three thermoplastic resin layers constituting the oxygen-absorbing multi-layer laminate, the intermediate layer positioned between the other layers is preferably made porous. More specifically, the oxygen-absorbing multi-layer laminate preferably has a laminated structure comprising, from the inside, an oxygen-permeable layer made of an oxygen-permeable thermoplastic resin, a porous resin layer made of a porous thermoplastic resin, a thermoplastic resin layer and a gas barrier layer, in which the particles of the oxygen-absorbing agent are interspersed between the porous resin layer and the thermoplastic resin layer.

The porous resin layer prevents the oxygen-absorbing agent from blooming into the surface of the multi-layer laminate and allows oxygen to promptly reach the oxygen-absorbing agent. The porous resin layer is preferably made of a thermoplastic resin incorporated with a filler, preferably an inorganic filler. The same thermoplastic resin as mentioned above may be used as the material for the porous resin layer. The inorganic filler may include synthetic silica, silica-aluminosilicate, titanium oxide, diatomaceous earth, alumina, aluminum hydroxide, barium sulfate, calcium sulfate, carbon black, activated carbon, calcium oxide, zeolite, bentonite, activated clay, etc. Of the above inorganic fillers, synthetic silica, titanium oxide, alumina and barium sulfate are preferable in view of concealing the oxygen-absorbing agent from the sight. The particle size of the inorganic filler is not specifically limited, and preferably 0.1–100 $\mu$m, more preferably 0.1–50 $\mu$m. The inorganic filler may be contained in the porous resin layer preferably 1–80% by weight and more preferably 5–70% by weight.

The porous resin layer is preferably mono or biaxially stretched together with the other resin layers to facilitate the permeation of oxygen into the oxygen-absorbing agent by enlarging the size of pores in the porous resin layer. For example, after forming a porous resin layer and an thermoplastic resin layer in this order on an oxygen-permeable layer while interposing the oxygen-absorbing agent between the porous resin layer and the thermoplastic resin layer, the resulting laminate is stretched in a suitable manner. Preferably, after laminating an oxygen-permeable layer and a porous resin layer by co-extrusion, the resultant laminate is stretched, followed by lamination of a thermoplastic resin layer on the porous resin layer while interposing the oxygen-absorbing agent therebetween. The porous resin layer is stretched preferably 2–10 times, more preferably 3–8 times as the original size.

More specifically, the oxygen-absorbing multi-layer laminate having the porous resin layer is produced preferably as described below.

A laminate of the oxygen-permeable layer and the porous resin layer is stretched, and then the oxygen-absorbing agent is sprinkled on the porous resin layer. After disposing the thermoplastic resin layer (hereinafter referred to as "smoothing layer") on the sprinkled surface of the porous resin layer, the gas barrier layer is formed on the smoothing layer. In this method, the smoothing layer having thereon the gas barrier layer may be disposed on the sprinkled surface in place of successively laminating the smoothing layer and the gas barrier layer.

Alternatively, the stretching operation may be carried out on a laminate comprising the oxygen-permeable layer, the porous resin layer and the smoothing layer in this order with the oxygen-absorbing agent interspersed between the porous resin layer and the smoothing layer. On the smoothing layer of the stretched laminate, the gas barrier layer is further disposed.

In another embodiment, a stretched porous resin layer is disposed on the oxygen-permeable layer. After sprinkling the oxygen-absorbing on the porous resin layer, the smoothing layer is disposed on the sprinkled surface. Then, the gas barrier layer is further formed on the smoothing layer. In this method, the smoothing layer having thereon the gas barrier layer may be disposed on the sprinkled surface in place of successively laminating the smoothing layer and the gas barrier layer.

Figure 1:
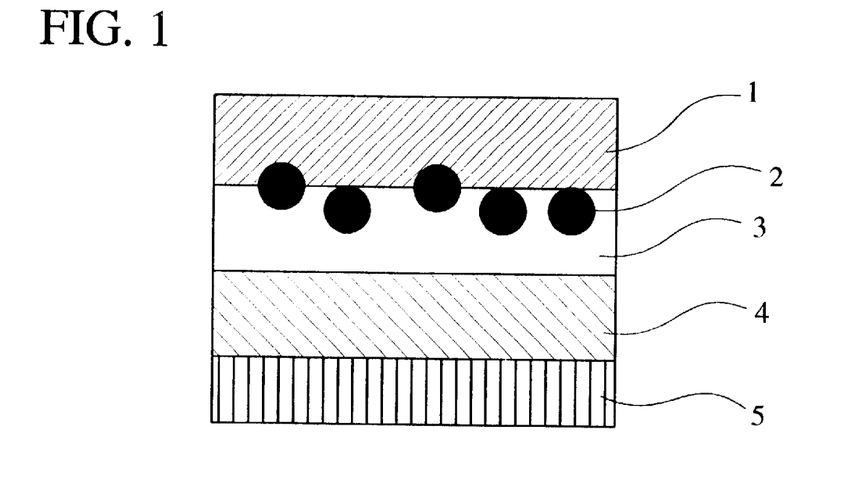
FIGS. 1 and 2 are cross sectional views showing different embodiments of the oxygen-absorbing multi-layer laminate according to the present invention, wherein the reference numeral 1 is a first thermoplastic resin layer, the reference numerals 2 and 2' are particles of the oxygen-absorbing agent, the reference numeral 3 is a second thermoplastic resin layer, the reference numeral 4 is a gas barrier layer, the reference numeral 5 is a protecting layer, the reference numeral 6 is a thermoplastic resin layer C incorporated with a pigment, the reference numeral 7 is a thermoplastic resin layer B, and the reference numeral 8 is a thermoplastic resin layer A.
Figure 2:
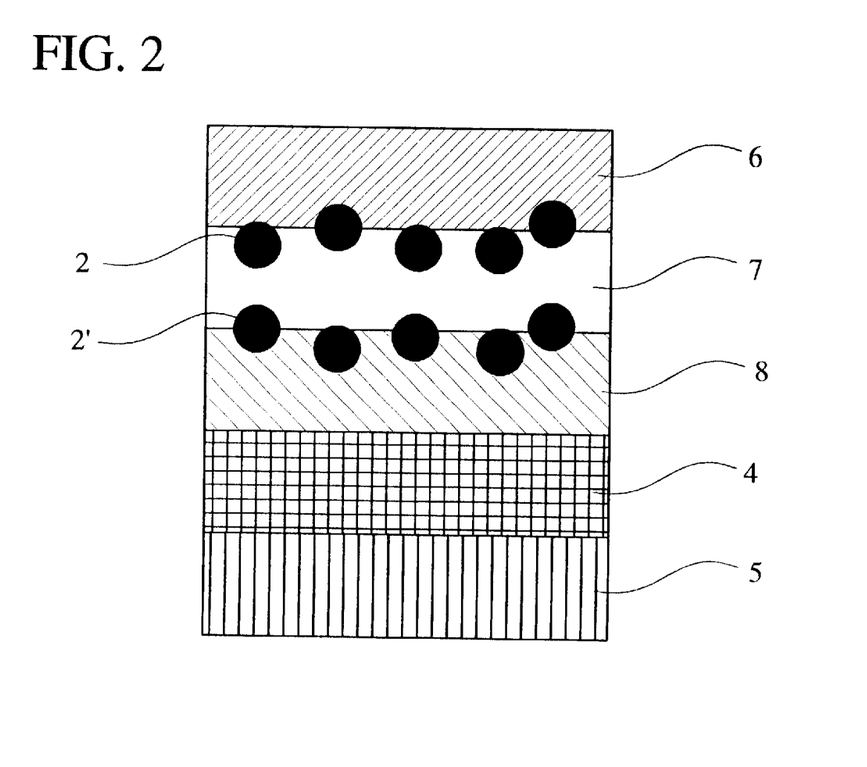

FIGS. 1 and 2 are cross-sectional views showing oxygen-absorbing multi-layer laminates of the present invention having different laminated structures. In FIG. 1, a second thermoplastic resin layer 3, a gas barrier layer 4 and a protecting layer 5 are successively laminated in this order on a first thermoplastic resin layer 1. Particles of the oxygen-absorbing agent 2 are locally interspersed between the first thermoplastic resin layer 1 and the second thermoplastic resin layer 3. In FIG. 2, a thermoplastic resin layer 7, a thermoplastic resin 8, a gas barrier layer 4 and a protecting layer 5 are successively laminated in this order on a pigment-added thermoplastic resin layer 6. Particles of the oxygen-absorbing agent 2, 2' are locally distributed between the pigment-added thermoplastic resin layer 6 and the thermoplastic resin layer 7 and between the thermoplastic resin layer 7 and the thermoplastic resin layer 8.

The first to fourth oxygen-absorbing multi-layer laminates of the present invention are used as a packaging material in the form of film or sheet in various applications. The packaging material is fabricated to a packaging container such as a bag, a tray, etc. to obtain an oxygen-absorbing packaging container excellent in appearance, storage life of flavor and taste, etc. as well as in packaging operation.

At least a portion of the surface of the packaging container according to the present invention is made of any one of the first to fourth oxygen-absorbing multi-layer laminates having a gas barrier layer on one surface thereof, preferably having an oxygen-permeable thermoplastic resin layer on the opposite surface. Apart of the wall of a packaging container is made of the oxygen-absorbing multi-layer laminate so that the gas barrier layer constitutes a part of the outer surface of the packaging container. The packaging container of the present invention having such a construction efficiently absorbs a slight amount of oxygen permeating from outside the container into the package wall as well as oxygen present inside the packaging container to prolong the storage life of the contents being preserved in the packaging container without being deteriorated by the action of oxygen. A packaging container such as a bag, a tray, a tube, etc. fabricated from the oxygen-absorbing multi-layer laminate of the present invention and a packaging container having a cap, a top seal film, etc. made of the oxygen-absorbing multi-layer laminate of the present invention acquire an effective oxygen-absorbing ability. For example, a functional packaging bag such as a standing pouch is obtained by forming tow side walls and a bottom wall with the oxygen-absorbing multi-layer laminate of the present invention.

The oxygen-absorbing packaging container of the present invention is usable for preserving various products because it exhibits an excellent effect on preventing the quality of the products from being deteriorated by the action of oxygen. The oxygen-absorbing packaging container of the present invention is also applicable in preserving a high water-content product such as a liquid food and medicine and a moist food and medicine, although a known oxygen absorber of small bag package type, etc. is difficult to be applied to preservation of the high water-contend product. The liquid food may include liquid drinks such as juices, liquors, coffees, teas, jelly drinks and healthy drinks; seasonings such as seasoning liquids, sauces, soy sauces, dressings, liquid stocks, mayonnaises, fermented soybean pastes and ground spices; pasty cakes such as creams and chocolates; and liquid processed foods such as liquid soups, boiled foods, pickles and stews. The moist food may include unboiled or boiled noodles such as buckwheat noodles, white noodles and Chinese noodles; uncooked rices such as polished rice, wetted rice and unwashed rice; boiled rices; cooked rice products such as boiled rices mixed with fish and vegetables; and powdered stocks such as powder soups and stock essences. The liquid or moist product other than food may include solutions and emulsions of chemicals such as industrial materials, agricultural chemicals and insecticides, liquid and pasty medicines, face lotions, toilet creams, milky lotions, hair liquids, hair dyes, shampoos, etc.

The oxygen-absorbing multi-layer laminate of the present invention has an advantage of being produced with reduced cost by a simplified process as compared with those produced by a known method including a step of producing a compound by kneading an oxygen-absorbing agent into a resin. Also, since the severe thermal cycle can be avoided, the oxygen-absorbing multi-layer laminate is not subjected to heat deterioration of the resin to show excellent properties in preserving life of flavor and taste, impact strength, tear resistance, bending properties, etc. In addition, the packaging container made of the oxygen-absorbing multi-layer laminate of the present invention is free from the trouble of the leakage of the oxygen-absorbing powder separated from the layers and the penetration of water into the gap.

The present invention will be explained in more detail by reference to the following examples which should not be construed to limit the scope of the present invention.

EXAMPLE 1

In a vacuum mixing-drying machine equipped with a heating jacket, were placed 100 kg of a reduced iron powder having an average particle size of 30 $\mu$m, and 5 kg of a 50-weight % aqueous solution of calcium chloride were sprayed thereinto, while heating at 140° C. under a reduced pressure of 10 mmHg. After drying, coarse particles were removed by screening to obtain an oxygen-absorbing agent in the form of particles.

In an extrusion laminator having a single-screw extruder, a T-die and a pair of cooling rolls, the oxygen-absorbing agent was sprinkled on a 30 $\mu$m linear low-density polyethylene film (LLDPE, first thermoplastic resin film) being fed into the laminator in an amount of 20 g/m$^2$. Then, a 60 $\mu$m metallocene LLDPE film (second thermoplastic resin film) incorporated with 5 weight % of titanium oxide was extruded from the T-die and stacked on the first thermoplastic resin film. The resultant stack was extrusion-laminated by passing it through the cooling rolls to obtain a two-layered oxygen-absorbing multi-layer laminate containing the oxygen-absorbing agent interposed between the first thermoplastic resin layer and the second thermoplastic resin layer. As a result of the cross-sectional observation of a sampled laminate under a microscope, it was confirmed that the first and second thermoplastic resin layers were integrally press-bonded to each other without permitting gap. It was further confirmed that a part of particles of the oxygen-absorbing agent was embedded in the second thermoplastic resin layer and the other in both the layers.

Then, an aluminum foil of 9 $\mu$m thick was extrusion-laminated on the first thermoplastic resin layer via an adhesive layer of 15 $\mu$m thick made of a low-density polyethylene (LDPE) to form a gas barrier layer. On the aluminum foil, a polyethylene terephthalate film of 12 $\mu$m thick was dry-laminated as a protecting layer to obtain a five-layered oxygen-absorbing multi-layer laminate I having a gas barrier layer.

The oxygen-absorbing multi-layer laminate I had a construction of 60 $\mu$m second thermoplastic resin layer containing 5 weight % titanium oxide/interposed particles of oxygen-absorbing agent (20 g/m$^2$)/30 $\mu$m first thermoplastic resin layer/15 $\mu$m adhesive layer/9 $\mu$m aluminum foil/12 $\mu$m PET layer.

EXAMPLE 2

In the same manner as in Example 1, a two-layered oxygen-absorbing multi-layer laminate was produced except for changing the sprinkling amount of the oxygen-absorbing agent to 50 g/m$^2$. As a result of the cross-sectional observation of a sampled laminate under a microscope, it was confirmed that the first and second thermoplastic resin layers were integrally press-bonded to each other without permitting gap, and that a part of particles of the oxygen-absorbing agent were embedded in the second thermoplastic resin layer and the other in both the layers. Then, in the same manner as in Example 1, a gas barrier layer and a protecting layer were laminated on the second thermoplastic resin layer to obtain a five-layered oxygen-absorbing multi-layer laminate II having a gas barrier layer.

The oxygen-absorbing multi-layer laminate II had a construction of 30 $\mu$m first thermoplastic resin layer/interposed particles of oxygen-absorbing agent (50 g/m$^2$)/60 $\mu$m second thermoplastic resin layer containing 5 weight % titanium oxide/15 μm adhesive layer/9 μm aluminum foil/12 μm PET layer.

EXAMPLE 3

Two pieces of small film (10 cm×10 cm) taken from the oxygen-absorbing multi-layer laminate I were stacked with the respective second thermoplastic resin layers inside. The stack was heat-sealed at three edges to obtain a packaging bag I having a wall made of the oxygen-absorbing multi-layer laminate I. Separately, in the same manner as above, a packaging bag II having a wall made of the oxygen-absorbing multi-layer laminate II was produced.

Each packaging bag was filled with 30 g of a concentrated fat-containing liquid stock for Chinese noodle by using an automatic filling machine, and then sealed at the remaining open edge to obtain a fatty soup-stock bag containing about 2 cc air. After a boiling treatment at 85° C. for 30 minutes, the oxygen concentration in the bag was determined less than 0.1 volume % for both the bags I and II. The flavor of the soup-stock in both the boiling-treated bags was examined 7 days and 14 days after the storage at 23° C. The results showed that the soup-stock was successfully preserved because no offensive odor such as oxidative odor due to oxidation of fat was perceived after 7-day storage and 14-day storage.

The heat-seal strength, measured according to JIS Z1526, of the bags stored for 14 days was 2.5 kg/15 mm for the bag I and 3.0 kg/15 mm for the bag II to show a sufficient preservation of the strength. Also, the inner surface of the bags I and II stored for 14 days kept the same good appearance as observed before storing because no bleeding and rusting of the oxygen-absorbing agent were observed thereon.

EXAMPLE 4

The oxygen-absorbing multi-layer laminate II was slit into the form of strip having a width of 25 cm. By using two pieces of strip as the packaging material, a polished rice bag containing 1 kg polished rice was prepared by a rotary diroll filling machine of opposite sides-heating type. The bag was 25 cm×30 cm in size and contained about 200 cc air. The oxygen concentration in the bag after storage at 23° C. for 7 days was less than 0.1 volume %. After 3-month storage, it was confirmed that the polished rice was successfully stored without generating offensive smell, and no change was observed in the appearance of the laminated film constructing the package wall.

EXAMPLE 5

The oxygen-absorbing agent prepared in Example 1 was sprinkled on a 30 μm propylene-ethylene block copolymer (block PP) film (first thermoplastic resin film) incorporated with 10 weight % titanium oxide in a sprinkling amount of 10 g/m$^2$ while feeding the film into an extrusion laminator having a single-screw extruder, a T-die and cooling rolls. Then, a block PP film (second thermoplastic resin film) of 50 μm thick was extruded from the T-die and stacked on the first thermoplastic resin film. The resultant stack was extrusion-laminated by passing it through the cooling rolls to obtain a two-layered oxygen-absorbing multi-layer laminate containing the oxygen-absorbing agent interposed between the first and second thermoplastic resin layers. As a result of the cross-sectional observation of a sampled laminate under a microscope, it was confirmed that the first and second thermoplastic resin layers were integrally press-bonded to each other without permitting gap, and that a part of particles of the oxygen-absorbing agent was embedded in the second thermoplastic resin layer and the other in both the layers.

Then, an aluminum foil of 9 μm thick was dry-laminated on the second thermoplastic resin layer. On the aluminum foil, a nylon 6 film of 15 μm thick and a polyethylene terephthalate film of 12 μm thick were dry-laminated as protecting layers to obtain a five-layered oxygen-absorbing multi-layer laminate III having a gas barrier layer.

The oxygen-absorbing multi-layer laminate III had a construction of 30 μm first thermoplastic resin layer containing 10 weight % titanium oxide/interposed particles of oxygen-absorbing agent (10 g/m$^2$)/50 μm second thermoplastic resin layer/9 μm aluminum foil/15 μm nylon 6 layer/12 μm PET layer.

The impact strength of the oxygen-absorbing multi-layer laminate III was measured according to JIS P8134 from the side of the first thermoplastic resin layer. As a result, it was confirmed that the laminate had a sufficient impact strength of 13 kg·cm at 23° C. and 11 kg·cm at 5° C. Further, a heat-sealing test was conducted according to JIS Z1526 by heat-sealing the sealant layers (first thermoplastic resin layers) at 170° C. for 2 seconds. The result showed a sufficient heat-sealing strength as high as 4.3 kg/15 mm.

Two pieces of small film (15 cm×25 cm) taken from the oxygen-absorbing multi-layer laminate III were stacked with the first thermoplastic resin layers inside. The stack was heat-sealed at three edges to obtain a packaging bag III having a wall made of the oxygen-absorbing multi-layer laminate III. The packaging bag III was filled with 200 g of cooked rice gruel mixed with salmon flesh and then sealed at the open edge to obtain a gruel bag containing about 10 cc air. After a retort treatment at 130° C. for 12 minutes, the gruel bag was stored at 23° C. The oxygen concentration was 1.5 volume % immediately after the high retort treatment, while lowered to less than 0.1 volume % 3 days after the storage. The flavor and taste of the stored rice gruel were examined after 3-month storage. It was confirmed that the rice gruel was successfully preserved because the flavor and taste before the heat treatment were retained.

Comparative Example 1

In a twin-screw extruder equipped with a side feeder, the oxygen-absorbing agent prepared in Example 1, calcium oxide and the block PP used for preparing the second thermoplastic resin film of Example 5 were kneaded while supplying the oxygen-absorbing agent from the side feeder to obtain a pellet comprising 20% by weight of the oxygen-absorbing agent and 80% by weight of the block PP.

In the same manner as in Example 5, a film of 50 μm thick formed by extruding the pellet from the T-die was extrusion-laminated on an block PP film of 30 μm thick incorporated with 10 weight % titanium oxide to obtain a two-layered oxygen-absorbing multi-layer laminate consisting of an oxygen-permeating layer and an oxygen-absorbing layer. The content of the oxygen-absorbing agent in the laminate corresponded to a sprinkling amount of about 10 g/m$^2$.

As a result of the cross-sectional observation of a sampled laminate under a microscope, it was confirmed that particles of the oxygen-absorbing agent was dispersed throughout the oxygen-absorbing layer.

Thereafter, the laminating procedures and the preserving test of Example 5 were repeated.

The oxygen concentration in the bag was 3.8 volume % immediately after the high retort treatment and it took 4 days until the oxygen concentration was lowered to less than 0.1 volume %. After 3-month storage, it was confirmed that the flavor and taste of the rice gruel mixed with salmon flesh were deteriorated due to the generation of odor of deteriorated resin and a slight oxidative smell.

EXAMPLE 6

In a tandem extrusion laminator having a pair of single-screw extruders, a T-die and a cooling roll, a 20 μm LLDPE film (resin layer B; available from Dow Chemical Co. under the trade name of PT1450) containing 10 weight % titanium oxide extruded from the first extruder was extrusion-laminated on a 30 μm LLDPE film (resin layer A; available from Tokyo Cellophane Co. Ltd. under the trade name of TCS) being fed into the laminator. After sprinkling the oxygen-absorbing agent prepared in Example 1 on the surface of the resin layer B in an amount of 30 g/m², a 30 μm LLDPE film (resin layer C; available from Dow Chemical Co. under the trade name of PT1450) extruded from the second extruder was laminated thereon. The laminate was rolled by a mirror-finished cooling roll on the side of the resin layer C to thermally press-bond the layers. On the resin layer C of the multi-layer laminate IV thus obtained, an aluminum foil (gas barrier layer D) of 7 μm thick and a PET film of 12 μm thick were dry-laminated to obtain a oxygen-absorbing multi-layer laminate V.

As a result of the cross-sectional observation on the multi-layer laminate IV and the oxygen-absorbing multi-layer laminate V under a microscope, it was confirmed that the respective layers were integrally press-bonded to each other without permitting gap, and that a part of particles of the oxygen-absorbing agent was embedded in the resin layer C and the other particles were embedded in both the resin layers B and C across the interface therebetween.

The construction of the oxygen-absorbing multi-layer laminate V was, from the inside, resin layer A of 30 μm thick/resin layer B of 20 μm thick containing 10 weight % titanium oxide/interposed particles of oxygen-absorbing agent (30 g/m²)/resin layer C of 30 μm thick/aluminum foil of 7 μm thick/PET layer of 12 μm thick.

The oxygen-absorbing multi-layer laminate V and a commercially available gas barrier multi-layer film (available from Idemitsu Petrochemical Co. Ltd. under the trade name of Uniaslon TB-1000) having a construction of LLDPE of 40 μm thick/LDPE of 20 μm/gas barrier layer of 15 μm thick were respectively slit into the form of strip having a width of 15 cm. By using the strips as the packaging material, a pickles bag containing 150 g of pickles of Chinese cabbage in liquid was prepared by a rotary diroll filling machine of opposite sides-heating type. The bag was 20 cm×15 cm in size and contained about 0.5 cc air attributable to bubbles in the liquid. After boiling treatment at 85° C. for 30 minutes, the bag was stored at 10° C. After 7-day storage, the flavor and color of pickled Chinese cabbage were examined to confirm that the pickles were successfully stored because the flavor and color before filling were retained.

The heat-sealing strength of the bag after 7-day storage was 3.8 kg/15 mm. The results of a visual inspection on the oxygen-absorbing multi-layer laminate showed that the rust of the oxygen-absorbing agent was sufficiently concealed from the sight and no delamination of the layers was observed.

EXAMPLE 7

A barrier film of 15 μm thick (available form Kuraray Co., Ltd. under the trade name of EVAL EF-CR) made of ethylene-vinyl acetate copolymer (EVOH) was dry-laminated on the white-printed surface of a PET film of 12 μm thick. The resultant laminate was laminated on the resin layer C of the multi-layer film IV obtained in Example 6 via an LDPE layer of 20 μm thick extrusion-laminated on the resin layer C while applying a two-pack urethane anchor coat (available from Takeda Chemical Industries, Ltd. under the trade name of TAKELAC A3205) in an amount of 0.4 g/m² to obtain a oxygen-absorbing multi-layer laminate VI.

As a result of the cross-sectional observation on the oxygen-absorbing multi-layer laminate VI under a microscope, it was confirmed that the respective layers were integrally press-bonded to each other without permitting gap, and that a part of particles of the oxygen-absorbing agent was embedded in the resin layer C and the other particles were embedded in both the resin layers B and C across the interface therebetween.

The construction of the oxygen-absorbing multi-layer laminate VI was, from the inside, resin layer A of 30 μm thick/resin layer B of 20 μm thick containing 10 weight % titanium oxide/interposed particles of oxygen-absorbing agent (30 g/m²)/resin layer C of 30 μm thick/LDPE layer of 20 μm thick/EVOH layer of 15 μm/PET layer of 12 μm thick.

A packaging bag of 15 cm×10 cm made of the oxygen-absorbing multi-layer laminate VI was filled with 100 g of dog food so as to contain 50 cc air. The bag was stored at 23° C. for one month. After one day of the storage, the oxygen concentration in the bag reached less than 0.1 volume %.

After one month-storage, the dog food retained the color and smell before storing without color change and generation of oxidative smell. The result of a visual inspection on the oxygen-absorbing multi-layer laminate showed that the rust of the oxygen-absorbing agent was sufficiently concealed from the sight and no delamination of the layers occurred.

Comparative Example 2

In a twin-screw extruder equipped with a side feeder, the oxygen-absorbing agent prepared in Example 1 and the LLDPE (available from Dow Chemical Co. under the trade name of PT1450) used for forming the resin layer C in Example 6 were kneaded at a resin temperature of 280° C. while supplying the oxygen-absorbing agent from the side feeder to obtain a pellet comprising 56% by weight of the oxygen-absorbing agent and 44% by weight of the LLDPE.

In the same manner as in Example 6, after laminating the resin layer B on the resin layer A, a film of 30 μm thick formed by extruding the pellet from the T-die was extrusion-laminated on the resin layer B to obtain a three-layered oxygen-absorbing multi-layer laminate consisting of the resin layer A, the resin layer B and the oxygen-absorbing layer. The content of the oxygen-absorbing agent in the laminate corresponded to a sprinkling amount of about 30 g/m².

As a result of the cross-sectional observation of a sampled laminate under a microscope, it was confirmed that particles of the oxygen-absorbing agent was dispersed throughout the oxygen-absorbing layer.

Then, the procedures in Example 7 were repeated to carry out the same preserving test.

The oxygen concentration in the bag after one day of storing was as high as 0.9 volume %. After one month-storage, it was confirmed that the dog food was slightly changed in color due to the oxidation and oxidative smell together with resin odor were noticed.

EXAMPLE 8

By using a tandem extrusion laminator, a 20 μm propylene-ethylene random copolymer (random PP) film (resin layer B; available from Chisso Co., Ltd. under the trade name of F8090) containing 10 weight % of titanium oxide extruded from the first extruder was extrusion-laminated on a 50 μm block PP film (resin layer A; available from Tokyo Cellophane Co., Ltd. under the trade name of RXC-11) being fed into the laminator. The oxygen-absorbing agent prepared in Example 1 was sprinkled on the resin layer B in an amount of 20 g/m$^2$, and then, a 30 μm random PP film (resin layer C; available from Chisso Co., Ltd. under the trade name of F8090) extruded from the second extruder was laminated on the sprinkled surface to obtain a multi-layer laminate. Further, an aluminum foil (gas barrier layer D) of 7 μm thick, a nylon film of 15 μm thick and a PET film of 12 μm were successively dry-laminated in this order on the resin layer C to obtain a oxygen-absorbing multi-layer laminate VII.

As a result of the cross-sectional observation on the oxygen-absorbing multi-layer laminate VII under a microscope, it was confirmed that the respective layers were integrally press-bonded to each other without permitting gap, and that a part of particles of the oxygen-absorbing agent were embedded in the resin layer C and the other particles were embedded in both the resin layers B and C across the interface therebetween.

The construction of the oxygen-absorbing multi-layer laminate VII was, from inside, resin layer A of 50 μm thick/resin layer B of 20 μm thick containing 10 weight % titanium oxide/interposed particles of oxygen-absorbing agent (20 g/m$^2$)/resin layer C of 30 μm thick/aluminum foil of 7 μm thick/nylon film of 15 μm/PET film of 12 μm thick.

By using the oxygen-absorbing multi-layer laminate VII and a gas barrier multi-layer film (70 μm CPP/7 μm aluminum foil/15 μm nylon/12 μm PET), a bag of 15 cm×10 cm size having a oxygen-absorbing side wall and a gas barrier side wall was produced. After placing 80 g of each of shiitake (mushroom), fried soy-bean curd, chicken, soy bean, carrot and premix mixed with sliced burdock root for seasoning boiled rice mixed with various ingredients, each bag was sealed and subjected to a retort treatment at 121° C. for 30 minutes. After storing at 35° C. for three months, each bag was subjected to, before opening, a pressure test and a drop test according to the methods in Notification No. 20 of the Ministry of Health and Welfare on retort packaging container. As a result thereof, it was confirmed that each bag had required qualities and properties. Also, each bag had a sufficient sealing strength as high as 5.6 kg/15 mm. It was further found that the premix for seasoning retained the flavor, taste and color before filling after the storage. The result of a visual inspection on the oxygen-absorbing multi-layer laminate showed that the rust of the oxygen-absorbing agent was sufficiently concealed from the sight and no delamination of the layers occurred.

EXAMPLE 9

In a tandem extrusion laminator having a pair of extrusion equipment comprising a single-screw extruder, a T-die and a cooling roll, the oxygen-absorbing agent prepared in Example 1 was sprinkled on an LLDPE film (thermoplastic resin film A, available from Tokyo Cellophane Co., Ltd. under the trade name of TUX-TC) being fed into the laminator in an amount of 20 g/m$^2$. Then, an LLDPE film (thermoplastic resin film B, available from Mitsui Chemicals, Inc. under the trade name of UZ2080C) was extruded from the first extruder in a molten state and extrusion-laminated on the sprinkled surface while rolling it by the cooling roll. After uniformly sprinkling the oxygen-absorbing agent prepared in Example 1 on the thermoplastic resin layer B in an amount of 20 g/m$^2$, a metallocene LLDPE film (thermoplastic resin film C, available from Dow Chemical Co. under the trade name of PT1450) containing 5 weight % titanium oxide extruded from the second extruder in a molten state was extrusion-laminated on the sprinkled surface while rolling by the cooling roll to obtain a oxygen-absorbing multi-layer laminate consisting of the thermoplastic resin layers A, B and C interposing the oxygen-absorbing agent between the thermoplastic resin layers A and B and between the thermoplastic resin layers B and C.

As a result of the cross-sectional observation of a sampled laminate under a microscope, it was confirmed that the thermoplastic resin layers A and B and the thermoplastic resin layers B and C were respectively integrally press-bonded to each other without permitting gap. It was further confirmed that a part of particles of the oxygen-absorbing agent interposed between the thermoplastic resin layers A and B was embedded in the thermoplastic resin layer B and the other in the interface therebetween. Likewise, a part of particles of the oxygen-absorbing agent interposed between the thermoplastic resin layers B and C was embedded in the thermoplastic resin layer C and the other in the interface therebetween.

Then, an aluminum foil of 9 μm thick was extrusion-laminated on the thermoplastic resin layer A via an adhesive layer made of an LDPE to form a gas barrier layer. On the aluminum foil, a polyethylene terephthalate film of 12 μm thick was dry-laminated as a protecting layer to obtain an oxygen-absorbing multi-layer laminate VIII having a gas barrier layer.

The construction of the oxygen-absorbing multi-layer laminate VIII was 60 μm thermoplastic resin layer C containing 5 weight % titanium oxide/interposed particles of oxygen-absorbing agent (20 g/m$^2$)/30 μm thermoplastic resin layer B/interposed particles of oxygen-absorbing agent (20 g/m$^2$)/30 μm thermoplastic resin layer A/15 μm adhesive layer/9 μm aluminum foil/12 μm PET layer. The total amount of the oxygen-absorbing agent interposed between the layers A to C was 40 g/m$^2$.

EXAMPLE 10

In the same manner as in Example 9, an oxygen-absorbing multi-layer laminate consisting of thermoplastic resin layers A, B and C was prepared except for changing the amounts of the oxygen-absorbing agent interposed between the layers A and B and the layers B and C to 100 g/m$^2$.

As a result of the cross-sectional observation of a sampled laminate under a microscope, it was confirmed that the thermoplastic resin layers A and B and the thermoplastic resin layers B and C were respectively integrally press-bonded to each other without permitting gap. It was further confirmed that a part of particles of the oxygen-absorbing agent interposed between the thermoplastic resin layers A and B was embedded in the thermoplastic resin layer B and the other in the interface therebetween. Likewise, a part of particles of the oxygen-absorbing agent interposed between the thermoplastic resin layers B and C was embedded in the thermoplastic resin layer C and the other in the interface therebetween.

Then, in the same manner as in Example 9, an aluminum foil and a polyethylene terephthalate film were laminated on the thermoplastic resin layer A to obtain an oxygen-absorbing multi-layer laminate IX having a gas barrier layer.

The construction of the oxygen-absorbing multi-layer laminate IX was 60 μm thermoplastic resin layer C containing 5 weight % titanium oxide/interposed particles of oxygen-absorbing agent (100 g/m$^2$) 30 μm thermoplastic resin layer B/interposed particles of oxygen-absorbing agent (100 g/m$^2$)/30 μm thermoplastic resin layer A/15 μm adhesive layer/9 μm aluminum foil/12 μm PET layer. The total amount of the oxygen-absorbing agent interposed between the layers A to C was 200 g/m$^2$.

EXAMPLE 11

Two pieces of small film (10 cm×10 cm) taken from the oxygen-absorbing multi-layer laminate VIII were stacked with the respective thermoplastic resin layers C inside. The stack was heat-sealed at three edges to obtain a packaging bag IV having a wall made of the oxygen-absorbing multi-layer laminate VIII. Separately, in the same manner as above, a packaging bag V having a wall made of the oxygen-absorbing multi-layer laminate IX was produced.

Each packaging bag was filled with 30 g of a concentrated fat-containing liquid stock for Chinese noodle by using an automatic filling machine, and then sealed at the remaining open edge to obtain a liquid stock bag containing about 2 cc air. After a boiling sterilization at 85° C. for 30 minutes, the oxygen concentration in the bag was less than 0.1 volume % for both the bags IV and V. The flavor of the liquid stock in both the boiling-treated bags was examined 7 days and 14 days after the storage at 23° C. The results showed that the liquid stock was successfully preserved because no offensive odor such as oxidative odor due to oxidation of fat was perceived after 7-day storage and 14-day storage.

The heat-seal strength, measured according to JIS Z1526, of the bags stored for 14 days was 2.5 kg/15 mm for the bag IV and 3.0 kg/15 mm for the bag V to show a sufficient preservation of the strength. Also, the inner surface of the bags IV and V stored for 14 days kept the same good appearance as observed before storing because no bleeding and rusting of the oxygen-absorbing agent were observed thereon.

EXAMPLE 12

The oxygen-absorbing multi-layer laminate IX was slit into the form of strip having a width of 25 cm. By using two pieces of strip as the packaging material, a polished rice bag containing 1 kg polished rice was prepared by a rotary diroll filling machine of opposite sides-heating type. The bag was 25 cm ×30 cm in size and contained about 200 cc air. The oxygen concentration in the bag after storage at 23° C. for 7 days was less than 0.1 volume %. After 3-month storage, it was confirmed that the polished rice was successfully stored without generating offensive smell, and no change was observed in the appearance of the laminated film constructing the package wall.

EXAMPLE 13

In a tandem extrusion laminator having a pair of extrusion equipment comprising a single-screw extruder, the oxygen-absorbing agent prepared in Example 1 was sprinkled on a random PP film (thermoplastic resin film A, available from Tokyo Cellophane Co., Ltd. under the trade name of RXC-3) being fed into the laminator in an amount of 80 g/m$^2$. Then, a random PP film (thermoplastic resin film B, available from Chisso Co., Ltd. under the trade name of F8090) was extruded from the first extruder and extrusion-laminated on the sprinkled surface while rolling it by the cooling roll. After uniformly sprinkling the oxygen-absorbing agent prepared in Example 1 on the thermoplastic resin layer B in an amount of 80 g/m$^2$, a random PP film (thermoplastic resin film C, available from Chisso Co., Ltd. under the trade name of F8090) containing 10 weight % titanium oxide extruded from the second extruder was extrusion-laminated on the sprinkled surface while rolling by the cooling roll to obtain an oxygen-absorbing multi-layer laminate consisting of the thermoplastic resin layers A, B and C interposing the oxygen-absorbing agent between the thermoplastic resin layers A and B and between the thermoplastic resin layers B and C.

As a result of the cross-sectional observation of a sampled laminate under a microscope, it was confirmed that the thermoplastic resin layers A and B and the thermoplastic resin layers B and C were respectively integrally press-bonded to each other without permitting gap. It was further confirmed that a part of particles of the oxygen-absorbing agent interposed between the thermoplastic resin layers A and B was embedded in the thermoplastic resin layer B and the other in the interface therebetween. Likewise, a part of particles of the oxygen-absorbing agent interposed between the thermoplastic resin layers B and C was embedded in the thermoplastic resin layer C and the other in the interface therebetween.

Then, an aluminum foil of 9 μm thick was dry-laminated on the thermoplastic resin layer A to form a gas barrier layer. On the aluminum foil, as the protecting layers, a nylon 6 film of 15 μm thick and a polyethylene terephthalate film of 12 μm thick were dry-laminated to obtain an oxygen-absorbing multi-layer laminate X having a gas barrier layer.

The construction of the oxygen-absorbing multi-layer laminate X was 60 μm thermoplastic resin layer C containing 10 weight % titanium oxide/interposed particles of oxygen-absorbing agent (80 g/m$^2$)/30 μm thermoplastic resin layer B/interposed particles of oxygen-absorbing agent (80 g/m$^2$)/40 μm thermoplastic resin layer A/9 μm aluminum foil/15 μm nylon 6 layer/12 μm PET layer. The total amount of the oxygen-absorbing agent interposed between the layers A to C was 160 g/m$^2$.

The impact strength of the oxygen-absorbing multi-layer laminate X was measured according to JIS P8134 from the side of the thermoplastic resin layer C. As a result, it was confirmed that the laminate had a sufficient impact strength of 13 kg·cm at 23° C. and 11 kg·cm at 5° C. Further, a heat-sealing test was conducted according to JIS Z1526 by heat-sealing the sealant layers (thermoplastic resin layers C) at 170° C. for 2 seconds. The result showed a sufficient heat-sealing strength as high as 4.3 kg/15 mm.

EXAMPLE 14

Two pieces of small film (15 cm×25 cm) taken from the oxygen-absorbing multi-layer laminate X were stacked with the thermoplastic resin layers C inside. The stack was heat-sealed at three edges to obtain a packaging bag VI having a wall made of the oxygen-absorbing multi-layer laminate X. The packaging bag VI was filled with 200 g of cooked rice gruel mixed with salmon flesh and then sealed at the open edge to obtain a gruel bag containing about 10 cc air. After a retort treatment at 130° C. for 12 minutes, the gruel bag was stored at 23° C. The oxygen concentration was 1.5 volume % immediately after the high retort treatment, while lowered to less than 0.1 volume % 3 days after the storage. The flavor and taste of the stored rice gruel were examined after 3-month storage. It was confirmed that the rice gruel was successfully preserved because the flavor and taste before the heat treatment were retained.

EXAMPLE 15

A mixture obtained by dry-blending 60 parts by weight of the oxygen-absorbing agent prepared in Example 1 and 40 parts by weight of LLDPE (available from Mitsui Chemicals, Inc. under the name of Ultzex 15100° C.; true specific gravity: 0.92 g/cm$^3$) was extruded from a twin-screw extruder at a resin temperature of 230° C. After cooling by a net belt equipped with a blower, the extrudate was pelletized to obtain a compound I (true specific gravity: 1.96 g/cm$^3$) blended with the oxygen-absorbing agent.

In an extrusion laminator having a single-screw extruder, a T-die, a pair of cooling rolls and a take-off unit, the oxygen-absorbing agent prepared in Example 1 was sprinkled on a 50 μm LLDPE film (available from Tokyo Cellophane Co., Ltd. under the trade name of TUX-TC#50) being fed into the laminator in an amount of 50 g/m$^2$. Then, an oxygen-absorbing film made of the compound I was stacked on the sprinkled surface so as to have a thickness of 50 μm. The stack was passed through the cooling rolls to carry out the extrusion lamination, thereby to obtain an oxygen-absorbing laminate consisting of the LLDPE layer and the oxygen-absorbing resin layer between which the oxygen-absorbing agent was interposed.

The total amount of the oxygen-absorbing agent in the oxygen-absorbing laminate thus obtained corresponded to 109 g/m$^2$. The content of the oxygen-absorbing agent in the oxygen-absorbing resin layer corresponded to 77% by weight, when assuming that all the oxygen-absorbing agent in the oxygen-absorbing laminate was dispersed only in the oxygen-absorbing resin layer of 50 μm thickness.

As a result of the cross-sectional observation of the laminate under a microscope, it was confirmed that the LLDPE layers and the oxygen-absorbing resin layer were integrally bonded to each other without permitting gap. It was further confirmed that a large portion of particles of the sprinkled oxygen-absorbing agent was embedded in the oxygen-absorbing resin layer in the vicinity of the interface and the other particles were embedded in both the layers across the interface therebetween. Also, the bleeding of the oxygen-absorbing agent to the surface of the LLDPE layer was not observed.

Then, an aluminum foil of 9 μm thick was laminated as the gas barrier layer on a 20 μm adhesive layer of LDPE (available from Nippon Unicar Co., Ltd. under the trade name of NUC8003) being extrusion-laminated on the oxygen-absorbing resin layer. On the aluminum foil, a PET film (available from Unitica, Ltd. under the trade name of Emblet PTJ-12) of 12 μm thick was dry-laminated as the protecting layer to obtain a five-layer oxygen-absorbing multi-layer laminate XI having a gas barrier layer.

The construction of the oxygen-absorbing multi-layer laminate XI was, from inside, 50 μm LLDPE layer/ interposed oxygen-absorbing agent (50 g/m$^2$)/50 μm oxygen-absorbing resin layer containing 60 weight % oxygen-absorbing agent/20 μm LDPE adhesive layer/9 μm aluminum foil/12 μm PET layer.

Two pieces of film taken from the oxygen-absorbing multi-layer laminate XI were stacked with the LLDPE layers inside, and the stack was heat-sealed at three edges to obtain a packaging bag VII with an inner size of 20 cm×10 cm. Two sealed sample bags, one containing a cotton soaked with 100 cc water and 200 cc air and the other containing a cotton soaked with 100 cc water and 300 cc air, were prepared. The sample bags were stored at 25° C. and the change with time of the oxygen concentration in each bag was measured. The time required until the oxygen concentration was lowered to 0.1 volume % was designated as the time required for oxygen-absorbing. The results are shown in Table 1.

Comparative Example 3

An oxygen-absorbing multi-layer laminate XII was obtained in the same manner as in Example 15 except for omitting the sprinkling of the oxygen-absorbing agent on the LLDPE film.

The construction of the oxygen-absorbing multi-layer laminate XII was, from inside, 50 μm LLDPE layer/50 μm oxygen-absorbing resin layer containing 60 weight % oxygen-absorbing agent/20 μm LDPE adhesive layer/9 μm aluminum foil 1 12 μm PET layer. The amount of the total oxygen-absorbing agent in the oxygen-absorbing multi-layer laminate XII was 59 g/m$^2$.

Sample bags VIII were prepared from the oxygen-absorbing multi-layer laminate XII and the change with time of the oxygen concentration in each bag was measured in the same manner as in Example 15. The results are shown in Table 1.

Comparative Example 4

A compound II (pure specific gravity: 2.89 g/cm$^3$) comprising 77 parts by weight of the oxygen-absorbing agent prepared in Example 1 and 23 parts by weight of LLDPE was prepared in the same manner as in Example 15. The amount of the oxygen-absorbing agent contained in compound II corresponded to 109 g/m$^2$ when the compound II was made into a layer of 50 μm thick.

The compound II was difficult to be made into the form of strand, and therefore, it could no be produced stably.

Although the compound II was tried to be made into an oxygen-absorbing multi-layer laminate in the same manner as in Example 15 except for omitting the sprinkling of the oxygen-absorbing agent on the LLDPE film, the compound II could not be formed into a continuous film of 50 μm, thereby failing to obtain an oxygen-absorbing multi-layer laminate.

EXAMPLE 16

A compound III (pure specific gravity: 1.25 g/cm3) comprising 30 parts by weight of the oxygen-absorbing agent prepared in Example 1 and 70 parts by weight of LLDPE was prepared in the same manner as in Example 15.

In an extrusion laminator having a single-screw extruder, a T-die, a pair of cooling rolls and a take-off unit, the oxygen-absorbing agent prepared in Example 1 was sprinkled on a 50 μm LLDPE film being fed into the laminator in an amount of 80 g/m$^2$. Then, an oxygen-absorbing film made of the compound III was extrusion-laminated on the sprinkled surface so as to have a thickness of 30 μm. The laminate was passed through the cooling rolls to obtain an oxygen-absorbing laminate consisting of the LLDPE layer and the oxygen-absorbing resin layer between which the oxygen-absorbing agent was interposed.

The total amount of the oxygen-absorbing agent in the oxygen-absorbing laminate thus obtained corresponded to 91 g/m$^2$.

As a result of the cross-sectional observation of the laminate under a microscope, it was confirmed that the LLDPE layers and the oxygen-absorbing resin layer were integrally bonded to each other without permitting gap. It was further confirmed that a large portion of the sprinkled oxygen-absorbing agent was embedded in the oxygen-absorbing resin layer in the vicinity of the interface and the other was embedded in both the layers across the interface therebetween. Also, the bleeding of the oxygen-absorbing agent to the surface of the LLDPE layer was not observed.

Then, an aluminum foil and a PET film were laminated on the oxygen-absorbing resin layer in the same manner as in Example 15 to obtain an oxygen-absorbing multi-layer laminate XIII.

The construction of the oxygen-absorbing multi-layer laminate XIII was, from inside, 50 μm LLDPE layer/interposed oxygen-absorbing agent (80 g/m$^2$)/30 μm oxygen-absorbing resin layer containing 30 weight % oxygen-absorbing agent/20 μm LDPE adhesive layer/9 μm aluminum foil/12 μm PET layer.

Sample bags IX were prepared from the oxygen-absorbing multi-layer laminate XIII and the change with time of the oxygen concentration in each bag was measured in the same manner as in Example 15. The results are shown in Table 1.

EXAMPLE 17

An LLDPE film was extrusion-laminated on the oxygen-absorbing resin layer of the laminate, which consisted of the first LLDPE layer and the oxygen-absorbing resin layer, prepared in Example 16 to form a second LLDPE layer of 50 μm thick. Then, an aluminum foil of 9 μm thick was laminated as the gas barrier layer on the oxygen-absorbing resin layer via a 20 μm adhesive layer of LDPE being extrusion-laminated on the oxygen-absorbing resin layer. On the aluminum foil, a PET film of 12 μm thick was dry-laminated as the protecting layer to obtain a six-layer oxygen-absorbing multi-layer laminate XIV having a gas barrier layer.

The construction of the oxygen-absorbing multi-layer laminate XIV was, from inside, 50 μm second LLDPE layer/30 μm oxygen-absorbing resin layer containing 30 weight % oxygen-absorbing agent/interposed oxygen-absorbing agent (80 g/m$^2$)/50 μm first LLDPE layer/20 μm LDPE adhesive layer/9 μm aluminum foil/12 μm PET layer.

Sample bags X were prepared from the oxygen-absorbing multi-layer laminate XIV and the change with time of the oxygen concentration in each bag was measured in the same manner as in Example 15. The results are shown in Table 1.

TABLE 1

|  | Amount of oxygen absorbing agent (g/m$^2$) | Time required for absorbing oxygen (day) 200 cc | Time required for absorbing oxygen (day) 300 cc | Oxygen-absorbing capacity (cc/cm$^2$) | Remarks |
| --- | --- | --- | --- | --- | --- |
| Ex. 15 | 109 | 2.5 | 4.5 | 1.6 | — |
| Comp. Ex. 3 | 59 | 5.5 | 8.5 | 0.9 | — |
| Comp. Ex. 4 | 109 | — | — | — | failure in film-forming |
| Ex. 16 | 91 | 2.0 | 4.0 | 1.4 | — |
| Ex. 17 | 91 | 2.0 | 4.0 | 1.4 | — |

As seen from Table 1, in Examples 15–17 where the oxygen-absorbing multi-layer laminate contained the sprinkled oxygen-absorbing agent to increase the amount thereof, the oxygen in the bag was rapidly absorbed as compared with Comparative Example 3 using a conventional oxygen-absorbing multi-layer laminate containing no sprinkled oxygen-absorbing agent. This effect was remarkable when the bag contained a larger amount of air because the time required for absorbing oxygen was significantly reduced.

As described in Comparative Example 4, it was quite difficult to produce an oxygen-absorbing resin film from a compound containing a larger amount of the oxygen-absorbing agent in industrial scale. Therefore, it has been difficult to obtain an oxygen-absorbing multi-layer laminate containing a larger amount of an oxygen-absorbing agent. The present invention has eliminated this problem by interspersing or interposing the oxygen-absorbing agent between layers, and made it possible to industrially provide an oxygen-absorbing multi-layer laminate containing a larger amount of the oxygen-absorbing agent with easy and stable control of the addition amount of the oxygen-absorbing agent.

EXAMPLE 18

From the oxygen-absorbing multi-layer laminate XI produced in Example 15 and a KON laminated film (15 μm KON available from Daicel Chemical Industries, Ltd. under the trade name of Cenesi KON #6000/60 μm polyethylene), a packaging bag XI having an inner size of 18 cm long and 15 cm broad was prepared. After filling the bag with 100 g fresh Chinese noodle, the bag was sealed by heat-sealing so as to contain about 80 cc air. The sealed bag was stored at 25° C. while measuring the change with time of the oxygen concentration in the bag to determine the time required for absorbing oxygen, namely, the time required for reducing the oxygen concentration to 0.1 volume %. After two-month storage, the appearance and the flavor of the noodle were examined. The results are shown in Table 2.

Comparative Example 5

A packaging bag XII was prepared in the same manner as in Example 18, except for using the oxygen-absorbing multi-layer laminate XII produced in Comparative Example 3 in place of the oxygen-absorbing multi-layer laminate XI. The same preserving test as in Example 18 was repeated using the bag XII. The results are shown in Table 2.

Comparative Example 6

A packaging bag XIII was prepared in the same manner as in Example 18, except for using, in place of the oxygen-absorbing multi-layer laminate XI, an aluminum foil-laminated film having a construction of 12 μm PET/9 μm aluminum foil/40 μm polyethylene. The same preserving test as in Example 18 was repeated using the bag XIII. The results are shown in Table 2.

TABLE 2

|  | Oxygen-absorbing multi-layer laminate | Amount of oxygen-absorbing agent (g/m$^2$) | Time required for absorbing oxygen (day) | Results of preservation |
| --- | --- | --- | --- | --- |
| Ex. 18 | laminate XI | 109 | 1.0 | well retained in appearance and flavor |
| Comp. Ex. 5 | laminate XII | 59 | 2.5 | slight yellowing |
| Comp. Ex. 6 | aluminum foil-laminated film | 0 | no oxygen-absorbing ability | yellowing and generation of offensive smell |

As seen from Table 2, in Example 18 where the oxygen-absorbing multi-layer laminate contained the sprinkled oxygen-absorbing agent to increase the amount thereof, the oxygen in the bag was rapidly absorbed and the preservation of the food was excellent. On the other hand, in Comparative Example 5 where the amount of the oxygen-absorbing agent was about half the amount in Example 18, the oxygen in the bag was absorbed slowly as compared with Example 18 and the preservation properties were poor as evidenced by the slight yellowing of the fresh Chines noodle, although superior in the preservation properties to Comparative Example 6 having no oxygen-absorbing ability.

EXAMPLE 19

A mixture obtained by dry-blending 40 parts by weight of the oxygen-absorbing agent prepared in Example 1 and 60 parts by weight of random PP (available from Nippon Polychem Co., Ltd. under the name of Novatek PPFL25R; true specific gravity: 0.9 g/cm$^3$) was extruded from a twin-screw extruder at a resin temperature of 260° C. After cooling by a net belt equipped with a blower, the extrudate was pelletized to obtain a compound IV (true specific gravity: 1.40 g/cm$^3$) blended with the oxygen-absorbing agent.

In an extrusion laminator having a single-screw extruder, a T-die, a pair of cooling rolls and a take-off unit, the oxygen-absorbing agent prepared in Example 1 was sprinkled on a 50 μm white CPP film being fed into the laminator in an amount of 80 g/m$^2$. Then, an oxygen-absorbing film made of the compound IV was stacked on the sprinkled surface so as to have a thickness of 50 μm. The stack was passed through the cooling rolls to carry out the extrusion lamination , thereby to obtain an oxygen-absorbing laminate consisting of the white CPP layer and the oxygen-absorbing resin layer made of the compound IV between which the oxygen-absorbing agent was interposed.

The total amount of the oxygen-absorbing agent in the oxygen-absorbing laminate thus obtained corresponded to 108 g/m$^2$. The content of the oxygen-absorbing agent in the oxygen-absorbing resin layer corresponded to 76% by weight, when assuming that all the oxygen-absorbing agent in the oxygen-absorbing laminate was dispersed only in the oxygen-absorbing resin layer of 50 μm thick.

As a result of the cross-sectional observation of the sampled laminate under a microscope, it was confirmed that the white CPP layers and the oxygen-absorbing resin layer were integrally bonded to each other without permitting gap. It was further confirmed that a large portion of the particles of the sprinkled oxygen-absorbing agent was embedded in the oxygen-absorbing resin layer in the vicinity of the interface and the other particles were embedded in both the layers across the interface therebetween.

Separately, by using a co-extruder, was produced a gas barrier multi-layer film consisting of 100 μm block PP (available from Nippon Polychem Co., Ltd. under the trade name of Novatek PPEC9)/20 μm maleic anhydride-modified polypropylene (available from Mitsui Chemicals, Inc. under the trade name of Admer QF305)/40 μm polyamide (available from Mitsubishi Gas Chemical Company, Inc. under the trade name of MX nylon 6007)/20 μm maleic anhydride-modified polypropylene/200 μm white block PP.

Then, the oxygen-absorbing laminate and the gas barrier multi-layer film were bonded to each other via a maleic anhydride-modified polypropylene while facing the oxygen-absorbing resin layer to the block PP layer to obtain a oxygen-absorbing multi-layer laminate XV.

A 300-cc rectangular oxygen-absorbing tray (inner size: 15 cm length×10 cm width×2 cm height) was made from the oxygen-absorbing multi-layer laminate XV by a plug-assist forming at a sheet temperature of 180° C. After filling the oxygen-absorbing tray with 200 g of rice gruel, the tray was covered with a top film and sealed by heat sealing so as to contain about 100 cc air. The top film had a construction of 50 μm CPP/9 μm aluminum foil/12 μm PET.

The sealed tray was stored at 25° C. while measuring the change with time of the oxygen concentration in the tray to determine the time required for absorbing oxygen, namely, the time required for reducing the oxygen concentration to 0.1 volume %. After three-month storage, the appearance and the flavor of the rice gruel were examined. The results are shown in Table 3.

Comparative Example 7

An oxygen-absorbing multi-layer laminate XVI was produced in the same manner as in Example 19 except that the sprinkling of the oxygen-absorbing agent on the CPP film was omitted. The construction of the oxygen-absorbing multi-layer laminate XVI was, from inside, 50 μm white CPP layer/50 μm oxygen-absorbing resin layer (content of the oxygen-absorbing agent: 40% by weight corresponding to 28 g/m$^2$)/30 μm maleic anhydride-modified polypropylene layer/100 μm block PP layer/30 μm maleic anhydride-modified polypropylene layer/50 μm MX nylon layer/30 μm maleic anhydride-modified polypropylene layer/200 μm block PP layer.

The oxygen-absorbing multi-layer laminate XVI was made into an oxygen-absorbing tray and the preservation test was conducted in the same manner as in Example 19. The results are shown in Table 3.

TABLE 3

| | Oxygen-absorbing multi-layer laminate | Amount of oxygen-absorbing agent (g/m$^2$) | Time required for absorbing oxygen (day) | Results of preservation |
|---|---|---|---|---|
| Ex. 19 | laminate XV | 108 | 3.0 | appearance and flavor retained well |
| Comp. Ex. 7 | laminate XVI | 28 | 9.0 | yellowing and offensive smell |

As seen from the results, in Example 19 where the oxygen-absorbing multi-layer laminate contained a larger amount of the oxygen-absorbing agent, the oxygen in the package was rapidly absorbed to produce a good preservation result. On the other hand, in Comparative Example 7 containing a small amount of the oxygen-absorbing agent, the rate of oxygen-absorbing was low and the rice gruel was deteriorated in its quality after the storage.

EXAMPLE 20

From a thermal co-extrusion laminator, was extruded a gas barrier sheet having a construction of 300 μm block PP layer (available from Nippon Polychem Co., Ltd. under the trade name of Novatek EC9)/20 μm maleic anhydride-modified polypropylene layer (adhesive layer, available from Mitsui Chemicals. Inc. under the trade name of Admer QF551) 140 μm EVOH layer (gas barrier layer, available from Kuraray Co., Ltd. under the trade name of Eval T)/20 μm maleic anhydride-modified polypropylene layer (adhesive layer, available from Mitsui Chemicals, Inc. under the trade name of Admer QF55 1)/300 μm block PP layer containing 5 weight % white pigment (available from Nippon Polychem Co., Ltd. under the trade name of Novatek EC9). Separately, the multi-layer laminate consisting of the resin layers A, B and C prepared in Example 8 was fed into the laminator, and the gas barrier sheet being extruded was stacked thereon so that the resin layer C faced the block PP layer containing no white pigment. The stack was successively subjected to a thermal lamination to obtain an oxygen-absorbing multi-layer laminate having a construction of resin layer A/resin layer B/interposed oxygen-absorbing agent (20 g/m$^2$)/resin layer C/block PP layer/adhesive layer/gas barrier layer/adhesive layer/block PP layer containing white pigment.

The oxygen-absorbing multi-layer laminate was thermally made into a packaging container in the form of cup having a diameter of 90 mm and a height of 45 mm. After placing 250 g of thick bean-meal soup mixed with chestnuts, the opening of the packaging container was sealed by a laminated film consisting of 15 μm MXD6 laminate film (available from Mitsubishi Chemical Corporation under the trade name of Nylon Superneal)/50 μm easy-peeling resin film (available from Tokyo Cellophane Co., Ltd. under the trade name of CMPSO13C). The sealed packaging container was subjected to a retort treatment at 121° C. for 30 minutes, and stored at 23° C. for three months.

After three-month storage, the packaging container was heated in an electric oven for 2 minutes while peeling the cover film in about 10 mm. Then, the cover film was peeled off, and the flavor and color of the thick bean-meal soup were examined. The chestnuts mixed therein retained its color before packaging without any color change. The flavor was also retained well without generating offensive smell and rein odor.

EXAMPLE 21

By using a two-color, two-layer co-extruder comprising a pair of single screw extruders, a T-die and a cooling roll, was produced a two-layer laminate film by co-extruding a 30 μm film of 1:1 (by weight) mixture of an ethylene-propylene random copolymer (melting point: 140° C., melt flow rate (MFR): 7 g/10 min at 230° C.) and an ethylene-α-olefin copolymer (MFR: 0.7 g/10 min at 230° C.), and a 60 μm film of 50:40:8:2 (by weight) mixture of an ethylene-propylene random copolymer (melting point: 140° C., MFR: 7 g/10 min at 230° C.), synthetic silica (average particle size: 5 μm, specific gravity: 2.5 g/cc), titanium oxide (average particle size: 0.25 μm, specific gravity: 4 g/cc) and calcium oxide (average particle size: 15 μm). The resultant laminate film was stretched monoaxially six times as the original size to obtain a two-layer laminate film having a 15 μm oxygen-permeable layer and a 30 μm porous resin layer. The total content of the inorganic fillers in the porous resin layer was 50% by weight.

The stretched laminate film was unwound and fed into an extrusion laminator having a single screw extruder, a T-die and a cooling roll, where particles of the oxygen-absorbing agent prepared in Example 1 were sprinkled on the porous resin layer of the laminate in an amount of 30 g/m$^2$. Then, a 30 μm film of an ethylene-propylene random copolymer (melting point: 153° C., MFR: 20 g/10 min at 230° C.) extruded from the T-die was laminated and thermally press-bonded to the sprinkled surface of the porous resin layer while rolling the surface of the extruded film by a mirror-polished roll, thereby to obtain a three-layer film XXI of oxygen-permeable layer/porous resin layer/thermoplastic resin layer (smoothing layer). On the smoothing layer, a 7 μm aluminum foil for a gas barrier layer and a 12 μm PET film for a protecting layer were successively dry-laminated to obtain an oxygen-absorbing multi-layer laminate XXII of the present invention.

As a result of the cross-sectional observation on the laminates XXI and XXII under a microscope, it was confirmed that the respective layers were integrally press-bonded to each other without permitting gap, and that an amount of particles of the oxygen-absorbing agent was embedded in the smoothing layer and the same amount of the other particles were embedded in both the smoothing layer and the porous resin layer across the interface therebetween.

The construction of the oxygen-absorbing multi-layer laminate XXII was, from the inside, 15 μm oxygen-permeable layer/30 μm porous resin layer containing synthetic silica, titanium oxide and calcium oxide/interposed particles of oxygen-absorbing agent (30 g/m$^2$)/30 μm smoothing layer/7 μm aluminum foil/12 μm PET layer.

Two pieces of small film (15 cm×10 cm) taken from the oxygen-absorbing multi-layer laminate XXII were stacked with the oxygen-permeable layers inside. The stack was heat-sealed at three edges to obtain a packaging bag having a wall made of the oxygen-absorbing multi-layer laminate XXII. After placing 100 g of sliced pieces of cheese in the packaging bag, the bag was heat-sealed to obtain a sealed bag containing about 150 cc air. The bag was then stored at 5° C. The oxygen concentration in the bag was reduced to less than 0.1 volume % one day after the storage. The flavor and taste of the stored cheese were examined after one-month storage. It was confirmed that the cheese was successfully preserved because the flavor and taste before the storage were well retained.

The heat-seal strength after the storage was 2.4 kg to show a sufficient preservation of the strength. Also, the inner surface of the bag kept the same good appearance as observed before storing because no bleeding and rusting of the oxygen-absorbing agent and no delamination of the layers were observed thereon.

What is claimed is:

1. An oxygen-absorbing multi-layer laminate comprising
    a first thermoplastic resin layer,
    a second thermoplastic resin layer which is adjacent to the first thermoplastic resin layer at an interface between said first thermoplastic resin layer and said second thermoplastic resin layer, and
    an oxygen-absorbing agent consisting essentially of a plurality of particles which are sandwiched between said first thermoplastic resin layer and said second thermoplastic resin layer.

2. An oxygen-absorbing multi-layer laminate comprising
    a first thermoplastic resin layer,
    a second thermoplastic resin layer which is adjacent to the first thermoplastic resin layer, and
    an oxygen-absorbing agent consisting essentially of a plurality of particles,
    said first thermoplastic resin layer and said second thermoplastic resin layer being integrally bonded to each other at an interface between said first thermoplastic resin layer and said second thermoplastic resin layer, wherein the particles of said oxygen-absorbing agent are sandwiched between the first thermoplastic resin layer and said second thermoplastic resin layer.

3. An oxygen-absorbing multi-layer laminate comprising
    at least three thermoplastic resin layers adjacent to each other at interfaces between said thermoplastic resin layers, and
    an oxygen-absorbing agent consisting essentially of a plurality of particles which are sandwiched between at least one pair of said thermoplastic resin layers which are adjacent to each other.

4. An oxygen-absorbing multi-layer laminate comprising
at least three thermoplastic resin layers adjacent to each other at interfaces, and
an oxygen-absorbing agent consisting essentially of a plurality of particles,
wherein each pair of adjacent thermoplastic resin layers are integrally bonded to each other at said interfaces and said particles of said oxygen-absorbing agent are sandwiched between at least one pair of said thermoplastic resin layers which are adjacent to each other.

5. An oxygen-absorbing multi-layer laminate comprising
an oxygen-absorbing agent consisting essentially of a plurality of particles,
an oxygen-permeable layer for permitting oxygen to pass thereinto and reach said particles of said oxygen-absorbing agent,
a porous resin layer disposed on said oxygen-permeable layer,
a thermoplastic resin layer disposed on said porous resin layer and
a gas barrier layer disposed on said thermoplastic resin layer,
wherein said particles of said oxygen-absorbing agent are sandwiched between said porous resin layer and said thermoplastic resin layer, and wherein said porous resin layer is formed by
incorporating 1 to 80 weight % of a filler having a particle size of 0.1 to 100 μm into a thermoplastic resin to obtain a thermoplastic resin mixture;
forming the thermoplastic resin mixture into an internal thermoplastic resin layer; and
monoaxially or biaxially stretching the layer.

6. A method of producing an oxygen-absorbing multi-layer laminate, comprising
(a) sprinkling particles of an oxygen-absorbing agent on a surface of a first thermoplastic resin layer, and
(b) thermally press-bonding a second thermoplastic resin layer, thereby sandwiching said particles of said oxygen-absorbing agent between said first thermoplastic resin layer and said second thermoplastic resin layer.

7. A method of producing an oxygen-absorbing multi-layer laminate comprising
(a) sprinkling particles of an oxygen-absorbing agent on a pre-heated surface of a first thermoplastic resin layer, and
(b) press-bonding a second thermoplastic resin layer to the first thermoplastic resin layer, thereby sandwiching said particles of said oxygen-absorbing agent between said first thermoplastic resin layer and said second thermoplasic resin layer.

8. An oxygen-absorbing multi-layer laminate comprising
a first thermoplastic resin layer, and
a second thermoplastic resin layer adjacent to the first thermoplastic resin layer at an interface between said first thermoplastic resin layer and said second thermoplastic resin layer,
wherein one of said thermoplastic resin layers includes particles of an oxygen-absorbing agent which are sandwiched between said first thermoplastic resin layer and said second thermoplastic resin layer.

9. The oxygen-absorbing multi-layer laminate according to any one of claims 1 to 4, wherein at least one layer of said thermoplastic resin layers is a permeating layer which is made porous by incorporating 1 to 80 weight % of a filler having a particle size of 0.1 to 100 μm into a thermoplastic resin to obtain a thermoplastic resin mixture;
forming the thermoplastic resin mixture into a layer; and
monoaxially or biaxially stretching the layer.

10. The oxygen-absorbing multi-layer laminate according to any one of claims 1 to 4, wherein a portion of said particles of the oxygen-absorbing agent is embedded within one of said adjacent thermoplastic resin layers in the vicinity of the interface and the resultant remaining portion of said particles of the oxygen-absorbing agent is disposed across the interface between adjacent thermoplastic resin layers.

11. The oxygen-absorbing multi-layer laminate according to any one of claims 1 to 4, wherein said oxygen-absorbing agent is an oxygen-absorbing composition containing an iron powder having an average particle size of 1–150 μm.

12. The oxygen-absorbing multi-layer laminate according to any one of claims 1 to 4, wherein said particles of said oxygen-absorbing agent are disposed in an amount of 1–150 g per 1 m$^2$ of said oxygen-absorbing multi-layer laminate.

13. The oxygen-absorbing multi-layer laminate according to any one of claims 1 to 4, wherein at least one layer of said thermoplastic resin layers is an outermost layer which is an oxygen-permeating layer to permit oxygen to pass into said outermost layer and reach said particles of said oxygen-absorbing agent.

14. The oxygen-absorbing multi-layer laminate according to any one of claims 1 to 4, wherein at least one of said thermoplastic resin layers is colored by a pigment.

15. The oxygen-absorbing multi-layer laminate according to any one of claims 1 to 4, wherein at least one of said thermoplastic resin layers is an oxygen-absorbing resin layer dispersed with said oxygen-absorbing agent.

16. The oxygen-absorbing multi-layer laminate according to any one of claims 1 to 4, wherein a gas barrier layer is laminated on at least one of the surfaces of said oxygen-absorbing multi-layer laminate.

17. The oxygen-absorbing multi-layer laminate according to claim 16, wherein an oxygen-permeating layer is laminated on a surface which is opposite to said gas barrier layer to permit oxygen to pass thereinto and reach said particles of said oxygen-absorbing agent.

18. A packaging container, at least a part of the surface thereof being made of the oxygen-absorbing multi-layer laminate according to claim 17.

19. A packaging container, at least a part of the surface thereof being made of the oxygen-absorbing multi-layer laminate according to claim 16.

20. The method of producing an oxygen-absorbing multi-layer laminate according to claim 6 or 7 wherein a gas barrier layer is formed by laminating a gas barrier film on said surface of the first thermoplastic resin layer or on a surface of the second thermoplastic layer prior to thermally press-bonding together the first thermoplastic resin layer and the second thermoplastic resin layer.

21. The method of producing an oxygen-absorbing multi-layer laminate according to claim 6 or 7, wherein a gas barrier layer is formed by laminating a gas barrier film on said surface of the first thermoplastic resin layer or on a surface of the second thermoplastic resin layer, simultaneously with thermally press-bonding together the first thermoplastic resin layer and the second thermoplastic resin layer.

22. The method of producing an oxygen-absorbing multi-layer laminate according to claim 6 or 7, wherein a gas barrier layer is formed by laminating a gas barrier film on said surface of the first thermoplastic resin layer or on a surface of the second thermoplastic resin layer after thermally press-bonding together the first thermoplastic resin layer and the second thermoplastic resin layer.

23. The method of producing an oxygen-absorbing multi-layer laminate according to claim 6 or 7, wherein said particles of said oxygen-absorbing agent are disposed in an amount of 1 to 150 g per 1 $m^2$ of said oxygen-absorbing multi-layer laminate.

24. The method of producing an oxygen-absorbing multi-layer laminate according to claim 6 or 7, wherein step (b) is performed by laminating the second thermoplastic resin layer which is extruded from a T-die in a molten state on the first thermoplastic resin layer so that the sprinkled particles of said oxygen-absorbing agent are sandwiched between said first thermoplastic resin layer and said second thermoplastic resin layer, followed by a thermal press-bonding by a roll.

25. The method of producing an oxygen-absorbing multi-layer laminate according to claim 6 or 7, wherein step (a) is performed by sprinkling said particles of said oxygen-absorbing agent on the pre-heated surface of the first thermoplastic resin layer, and step (b) is performed by press-bonding the second thermoplastic resin layer to the first thermoplastic resin layer by a roll.

26. The method of producing an oxygen-absorbing multi-layer laminate according to claim 6 or 7, wherein said oxygen-absorbing agent consists essentially of an iron composition powder having an average particle size of 1 to 150 $\mu$m.

\* \* \* \* \*